(12) United States Patent
Hursta

(10) Patent No.: US 10,083,433 B2
(45) Date of Patent: Sep. 25, 2018

(54) SYSTEMS AND METHODS FOR MANAGING ACCOUNTS

(71) Applicant: FIRST DATA CORPORATION, Greenwood Village, CO (US)

(72) Inventor: Michael Hursta, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 872 days.

(21) Appl. No.: 14/294,438

(22) Filed: Jun. 3, 2014

(65) Prior Publication Data

US 2015/0262160 A1 Sep. 17, 2015

Related U.S. Application Data

(60) Provisional application No. 61/952,619, filed on Mar. 13, 2014.

(51) Int. Cl.
*G06Q 40/00* (2012.01)
*G06Q 20/22* (2012.01)
*G06Q 30/02* (2012.01)
*G06Q 20/20* (2012.01)
*G06Q 20/04* (2012.01)

(52) U.S. Cl.
CPC ....... *G06Q 20/227* (2013.01); *G06Q 30/0253* (2013.01); *G06Q 30/0261* (2013.01); *G06Q 20/04* (2013.01); *G06Q 20/20* (2013.01)

(58) Field of Classification Search
CPC ...... G06Q 20/04; G06Q 20/20; G06Q 20/227; G06Q 30/0253; G06Q 30/0261
See application file for complete search history.

(56) References Cited

U.S. PATENT DOCUMENTS

| 8,401,904 | B1 * | 3/2013 | Simakov | G06Q 20/3572 705/16 |
|---|---|---|---|---|
| 2010/0010918 | A1 * | 1/2010 | Hunt | G06Q 20/102 705/26.1 |
| 2013/0246202 | A1 * | 9/2013 | Tobin | G06Q 20/20 705/18 |

* cited by examiner

*Primary Examiner* — Scott S Trotter
(74) *Attorney, Agent, or Firm* — Eversheds-Sutherland (US) LLP

(57) ABSTRACT

Embodiments of the disclosure relate to systems and methods for managing accounts associated with a proxy. In one embodiment, a method can include receiving a merchant ID associated with a merchant from either a user interface or a point of sale device associated with the merchant. The method can include receiving proxy information associated with a proxy from either the user interface or the point of sale device associated with the merchant. Further, the method can include determining a payment account associated with both the merchant and the proxy, based at least in part on the merchant ID or the proxy information, the payment account having a balance and selected from an account database. The method can include transmitting payment information associated with the payment account to either the user interface or the point of sale device, based at least in part on the merchant ID or the proxy information.

20 Claims, 4 Drawing Sheets

SYSTEMS AND METHODS FOR MANAGING ACCOUNTS

RELATED APPLICATION

The disclosure claims priority to U.S. Ser. No. 61/952,619, titled "Systems and Methods for Managing Accounts," filed on Mar. 13, 2014, the contents of which are incorporated by reference.

FIELD OF THE DISCLOSURE

The disclosure generally relates to managing accounts, and more particularly relates to systems and methods for managing multiple accounts and associated account information.

BACKGROUND

Consumers may have multiple accounts, such as prepaid accounts, bank accounts, credit card accounts, and/or loyalty accounts that may be associated with different merchants at any given time. Due to the potential quantity of accounts and number of different merchants, it may be difficult for consumers and merchants to manage and track various information associated with the respective accounts.

SUMMARY

Certain embodiments of the disclosure can provide systems and methods for managing accounts. In particular, the disclosure relates to systems and methods for managing multiple accounts and associated account information. According to one or more embodiments of the disclosure, a method is provided for managing accounts. The method may include receiving a merchant ID associated with a merchant from either a user interface or a point of sale device associated with the merchant. The method may also include receiving proxy information associated with a proxy from either the user interface or the point of sale device associated with the merchant, and determining a payment account associated with both the merchant and the proxy, based at least in part on the merchant ID or the proxy information. The payment account may have a balance and may be selected from an account database. The method may also include transmitting payment information associated with the payment account to either the user interface or the point of sale device, based at least in part on the merchant ID or the proxy information.

According to one or more other embodiments of the disclosure, a system is provided for managing accounts. The system may include at least one memory for storing data and computer-executable instructions. The system may also include at least one processor to access the at least one memory and to execute the computer-executable instructions. The at least one processor may be configured to execute the instructions to receive a merchant ID associated with a merchant from either a user interface or a point of sale device associated with the merchant, and can also receive proxy information associated with a proxy from either the user interface or the point of sale device associated with the merchant. The at least one processor may be further configured to determine a payment account associated with both the merchant and the proxy, based at least in part on the merchant ID or the proxy information. The payment account may have a balance and may be selected from an account database. The at least one processor may also be configured to transmit payment information associated with the payment account to either the user interface or the point of sale device, based at least in part on the merchant ID or the proxy information.

According to one or more other embodiments of the disclosure, a method is provided for managing accounts. The method may include transmitting a merchant ID associated with a merchant from either a user interface or a point of sale device associated with the merchant, and may also include transmitting proxy information received from a user bearing a proxy. The proxy information may be received from either the user interface or the point of sale device associated with the merchant. The method may further include receiving payment information associated with a payment account, based at least in part on the merchant ID or the proxy information, where the payment account comprises a balance and is selected from an account database. Based at least in part on the payment information, the method may include facilitating a sales transaction with the user.

Other systems and processes according to various embodiments of the disclosure will be apparent or will become apparent to one with skill in the art upon examination of the following figures and the detailed description. All other features and aspects, as well as other systems, methods, and processes, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1:
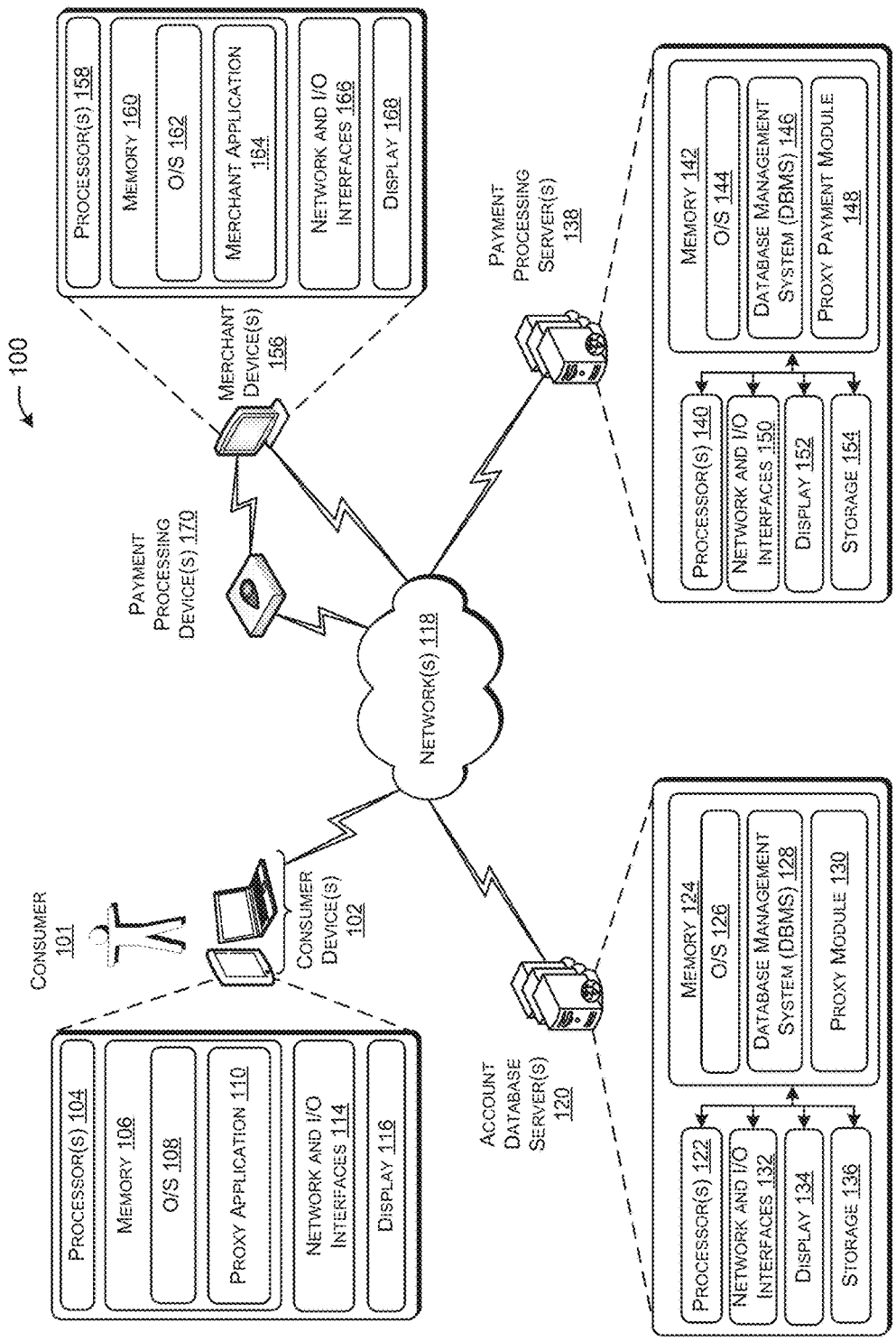
FIG. 1 illustrates an example system for managing accounts in accordance with one or more example embodiments.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Overview

This disclosure is directed to systems and methods for managing accounts. Broadly, certain systems and methods described herein may facilitate the access of one or more accounts, such as loyalty, bank, credit, and/or prepaid accounts, via a proxy. The proxy may be a physical proxy, such as a physical card or printed image, or may be a virtual proxy, such as a scannable barcode displayed on a user device, and may provide access to accounts or account information associated with the proxy. In some instances, the proxy may be associated with a proxy account that may hold a balance and can be configured to be used for purchases by a consumer, as discussed in this disclosure. Certain systems and methods described herein may further facilitate the association of consumer purchase transactions with loyalty account and/or prepaid account information.

One or more technical solutions can be achieved by certain embodiments of the disclosure. For example, in at least one embodiment, merchant identification and consumer transaction information associated with a purchase from a merchant can be associated with a proxy and communicated to a loyalty account or other account associated with the proxy. The proxy can be associated with several accounts, such as prepaid accounts in addition to loyalty accounts, and based at least in part on specific merchant locations where the proxy is used in a transaction, offers, discounts, or other advertising may be presented to the consumer via a mobile device or a merchant point-of-sale device, for example. Such offers, discounts, or other advertising may be targeted to specific users via the proxy and may increase purchase frequency or dollar value of purchases made by the consumer. The proxy can also be associated with funding sources to maintain or replenish a balance on an account associated with the proxy, such as a proxy account. Increased merchant revenue and/or consumer loyalty can result from certain systems and methods described in the disclosure.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

With reference now to FIG. 1, an example system 100 for managing accounts is shown according to one or more embodiments of the disclosure. The system 100 may include one or more consumer device(s) 102 that can be associated with a consumer 101. The consumer device(s) 102 may be in communication, via one or more networks 118, with one or more account database server(s) 120, one or more payment processing server(s) 138, one or more merchant device(s) 156, and/or one or more payment processing device(s) 170.

In general, the consumer device 102 may refer to any type of electronic device, and, more particularly, may refer to one or more of the following: a mobile device, a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The consumer device(s) 102 may include one or more computer processors 104, and a memory 106 storing an operating system (O/S) 108 and a proxy application 110. In addition, the consumer device(s) 102 may include one or more network and I/O interfaces 114, and a display 116. In certain embodiments, the consumer device(s) 102 may include one or more sensors capable of gathering information associated with a present environment of the consumer device(s) 102, or similar hardware devices, such as a camera, microphone, antenna, a fingerprint sensor, a voice or speech recognition device or microphone, a gesture capture or detection device, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The consumer device 102 may also include a chipset (not shown) for controlling communications between the one or more processors 104 and one or more of the other components of the consumer device 102. In certain embodiments, the consumer device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store the operating system 108 that includes a plurality of computer-executable instructions that may be implemented by the computer processor to perform a variety of tasks to operate the interface(s) and any other hardware installed on the consumer device 102. The memory 106 may also store content that may be displayed by the consumer device 102 or transferred to other devices (e.g., headphones or other mobile devices) to be displayed or played by the other devices. The memory 106 may also store content received from the other devices. The content from the other devices may be displayed, played, or used by the consumer device 102 to perform any necessary tasks or operations that may be implemented by the computer processor or other components in the consumer device 102.

The memory 106 may also include the operating system (O/S) 108, which may provide an interface between other application software executing on the consumer device 102 and hardware resources of the consumer device 102. More specifically, the operating system 108 may include a set of computer-executable instructions for managing hardware resources of the consumer device 102 and for providing common services to other application programs (e.g., managing memory allocation among various application programs). In some embodiments, the operating system 108 may be stored on multiple physical memory devices. The operating system 108 may include any operating system now known or which may be developed in the future including, but not limited to, any consumer operating system, any server operating system, any mainframe operating system, or any other proprietary or freely available operating system.

The memory 106 may also include the proxy application 110, which may include a user interface that allows the consumer 101 to register, access, and/or otherwise use a proxy. The proxy application 110 may be stored on the memory 106 of the consumer device 102, or in other embodiments may be stored entirely or partially remotely. In such an instance, the proxy application 110 may be accessible through a counterpart or corresponding application stored on the memory 106 of the consumer device 102. The proxy application 110 may prompt the consumer 101 for inputs and may store and/or transmit the inputs received from the consumer 101. The proxy application 110 may also interact with other components of the consumer device 102 to aggregate environmental information or ambient information of the environment surrounding the consumer device 102, for example location information, sound information, motion information, and the like, and store, analyze, or transmit the information to a remote server, such as account database server 120. The proxy application 110 may also analyze any collected information and use the analyzed information to provide the consumer 101 with targeted promotional offers, for example, as described in this disclosure. In some embodiments, the proxy application 110 may also automatically open or appear on the consumer device 102, for instance when the consumer device 102 is in a location near or at a merchant at which the consumer 101 has an account linked with the proxy. Proxies described in this disclosure can be employed as loyalty account identifiers, stored value vehicles such as prepaid accounts or gift card accounts, funding sources, or a combination thereof. In some embodiments, the proxy can carry a balance of its own in a designated proxy account, and the designated proxy account may be used for purchases or to fund or reload other accounts associated with the proxy. The proxy may further allow the consumer 101 to access any available loyalty rewards. Proxies of this disclosure may be managed on a cloud based processing host, such as account database server(s) 120 or payment processing server(s) 138, that receives transactions from, for example a point-of-sale (POS) device or other payment processing device 170, which may be in-store located at the merchant, or may otherwise be via an internet transaction, a mobile transaction, and the like.

Physical proxies may include cards, printed images, or other physical devices, such as cards including magnetic strips, near field communication (NFC) capabilities, Bluetooth™ or Bluetooth™ Low-Energy capabilities, Wi-Fi capabilities, or Radio Frequency Identification (RFID) or other physical cards with electronic communication capabilities. Physical proxies may further include any form of printed code, such as a scannable barcode, a QR code, an alphanumeric code, an image, or the like. In some embodiments, biometric information can be used as a physical proxy, such as a fingerprint, retina scan, or other unique biological information associated with the consumer 101 or combination of information with a consumer's biological information. In other embodiments, gesture information can be used as a physical proxy, such as a series of unique gestures or finger strokes captured via a camera or touch display device, such as the consumer device 102. For example, a consumer may gesture their signature in view of the camera or touch display device. In certain other embodiments, a combination of biometric information and/or gesture information can be used with a card or physical device and used as a physical proxy. In any instance, physical proxies may be associated with prepaid accounts, proxy accounts, loyalty accounts, or additional accounts as described below.

Consumers may obtain proxies from different sources. For example, a consumer may purchase a physical proxy from a physical merchant location. Consumers may also purchase physical proxies remotely, via the internet for example, and have the physical proxy delivered to a location associated with the consumer. Consumers may also receive proxies directly from retailers after or while establishing loyalty accounts with a specific retailer or loyalty service provider. Virtual proxies may be obtained via mobile application download stores, internet websites, or other sources of digital content. Physical or virtual proxies can correspond to mobile applications communicatively connected to the processing host that the proxy is processed on, for example a cloud based processing host. Consumers can also receive or purchase virtual proxies, for example from mobile application vendors or providers, mobile service carriers, mobile device manufacturers, or other sources of mobile device content. Virtual proxies may be in the form of scannable barcodes or images displayed on a device screen. Virtual proxies may also utilize NFC, Bluetooth™, or other communication capabilities of mobile devices and transmit information associated with the proxy via the communication capabilities of the mobile devices.

After obtaining a proxy, the consumer 101 may register the proxy using the proxy application 110. During the registration process, the proxy application 110 may prompt the consumer at the user interface to verify the consumer's identity, for example by requesting personal identification information from the consumer. Additional prompts requesting information from the consumer 101 may include account information for accounts the consumer 101 may wish to associate with the proxy. Such account information may include account numbers, associated zip codes or addresses, merchant names or identifiers, automatic updates or refresh settings, and the like.

Once the proxy is registered, the proxy application 110 may allow the consumer 101 to access the proxy. The proxy application 110 may further allow the consumer 101 to associate additional accounts with the proxy and subsequently enable the consumer 101 to access one or more accounts associated with the proxy. The proxy may be associated with accounts, such as prepaid accounts, credit card accounts, bank accounts, and/or loyalty accounts associated with specific merchants. The proxy application 110 may provide the consumer 101 with information associated with a consumer's activity with a merchant, such as purchase history, loyalty account points or balances, redeemable coupons, redeemed coupon history, merchant offers, progress toward a loyalty account prize/offer, promotional offers, or the like. In certain embodiments, the proxy application 110 may be configured to receive location information, merchant identifier(s), and/or other types of information associated with a merchant. Such information may be received from the user device 102, for example from GPS equipment associated with the user device 102, or in another example via BLUETOOTH™ from a beacon positioned at a certain merchant. Based at least in part on such information, the proxy application 110 may be configured to determine, identify, and/or otherwise access one or more prepaid or loyalty accounts associated with the proxy. In some embodiments, the proxy application 110 may also be configured to determine one or more gift or prepaid card accounts and/or balances associated with the proxy and the merchant identified by the merchant identifier. Such accounts and associated balances may be applied to one or more purchase transactions with the merchant.

The one or more network and I/O interfaces 114 may include one or more communication interfaces or network interface devices to provide for the transfer of data between the consumer device 102 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The consumer device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the consumer device 102 and another device, such as an access point, a host computer, a server, a router, a reader device, and the like. The networks 118 may include, but are not limited to, the internet, a private network, a virtual private network, a wireless wide area network, a local area network, a metropolitan area network, a telephone network, and so forth.

The display 116 may include, but is not limited to, a liquid crystal display, a light-emitted diode display, or an E-Ink™ display as made by E Ink Corp. of Cambridge, Mass. The display 116 may be used to show content to a user in the form of text, images, or video. In certain instances, the display 116 may also operate as a touch screen display that may enable the user to initiate commands or operations by touching the screen using certain finger or hand gestures.

Account database server(s) 120 may also be in communication with the network(s) 118. The account database server(s) 120 may also include a processor 122 and memory 124, which may store an operating system (O/S) 126, a database management system (DBMS) 128, and a proxy module 130. The account database server(s) 120 may also include network and I/O interfaces 132, a display 134, and a storage 136. Storage 136 may provide non-transient storage of computer-executable instructions and other data and may include removable storage and/or non-removable storage including, but not limited to, magnetic storage, optical disk storage, and/or tape storage. The storage 136 may include storage that is internal and/or external to the account database server(s) 120.

The DBMS 128 stored in memory 124 may be configured to support functionality for accessing, retrieving, storing, and/or manipulating data stored in external datastore(s), data stored in the memory 124, and/or data stored in the data storage 136. For example, the DBMS 128 may be configured to retrieve and/or otherwise access account data associated with the proxy. The DBMS 128 may use any of a variety of database models (e.g., relational model, object model, etc.) and may support any of a variety of query languages.

The proxy module 130 or application may be configured to store, retrieve, access, and/or otherwise provide account data associated with the proxy. As such, the proxy module 130 may keep track of prepaid accounts associated with the proxy, loyalty accounts (e.g., for different merchants) associated with the proxy, funding sources associated with the proxy, and other information, such as account balances, that may be associated with the proxy and/or consumer 101. For instance, the proxy module 130 may be configured to receive (e.g., from the proxy application 110 on the consumer device 102) consumer information, such as a consumer identifier associated with the consumer 101, and a merchant identifier. Based at least in part on the consumer identifier and the merchant identifier, the proxy module 130 may determine one or more offers to present to the consumer 101. For example, the proxy module 130 may present an offer of a percentage discount of a purchase at the merchant, or another promotional offer.

Furthermore, in certain implementations, the proxy module 130 may be configured to determine or otherwise identify, based at least in part on the consumer identifier and/or the merchant identifier, accounts associated with the proxy. The consumer 101 may be able to use accounts associated with the proxy for purchase transactions with the merchant associated with the merchant identifier. To this end, amounts applied to the purchase transaction may be deducted from the respective account balances associated with the account used for the transaction. In one example, the consumer 101 may have a balance of $50 on a prepaid card associated with the merchant, but desires to make a purchase of $75. The consumer 101, via the proxy, may be able to use the entire $50 prepaid card balance towards the purchase and the proxy may allow the consumer 101 to transfer the remaining $25 from a bank account to the prepaid card to fund the remaining balance of the purchase.

One or more payment processing server(s) 138 may also be in communication with the network(s) 118. The payment processing server(s) 138 may also include processor(s) 140 and memory 142, which may store an operating system (O/S) 144, a database management system (DBMS) 146, and a proxy payment module 148 or application. The payment processing server(s) 138 may also include network and I/O interfaces 150, a display 152, and a storage 154. Storage 154 may provide non-transient storage of computer-executable instructions and other data and may include removable storage and/or non-removable storage including, but not limited to, magnetic storage, optical disk storage, and/or tape storage. The storage 154 may include storage that is internal and/or external to the payment processing server(s) 138.

The DBMS 146 stored in memory 142 may be configured to support functionality for accessing, retrieving, storing, and/or manipulating data stored in external datastore(s), data stored in the memory 142, and/or data stored in the data storage 154. For example, the DBMS 146 may be configured to retrieve and/or otherwise access loyalty account data associated with the consumer 101. The DBMS 146 may use any of a variety of database models (e.g., relational model, object model, etc.) and may support any of a variety of query languages.

The proxy payment module 148 or application may be configured to store, retrieve, access, and/or otherwise provide account data to facilitate one or more payment transactions associated with the consumer 101 and a merchant. For instance, the proxy payment module 148 may be configured to receive consumer information, such as a consumer identifier, associated with the consumer 101, and proxy information associated with a proxy. In addition, the proxy payment module 148 may be configured to receive payment information associated with a payment transaction associated with the consumer 101. Based at least in part on the consumer identifier, the proxy information, and/or the payment information, the proxy payment module 148 may be configured to correlate the payment transaction with certain accounts associated with the proxy. In certain implementations, the proxy payment module 148 may also be configured to determine, adjust, redeem, and/or otherwise apply, based at least in part on the received information, one or more discounts and/or offers to the payment transaction.

It will be appreciated that while the account database server(s) 120 and the payment processing server(s) 138 are illustrated as separate components, in other embodiments, the functionality of both servers may be incorporated into a single server and/or group of servers.

One or more merchant device(s) 156 may also be in communication with the network(s) 118. The merchant device(s) 156 may also include processor(s) 158 and memory 160, which may store an operating system (O/S) 162 and a merchant application 164. The merchant device(s) 156 may also include network and I/O interfaces 166 and a display 168. Furthermore, the merchant device(s) 156 may be in communication with a payment processing device 170, either directly and/or via the network(s) 118.

In certain implementations, the merchant application 164 may be configured to communicate with the payment processing device(s) 170 in order to facilitate one or more purchase transactions between the consumer 101 and a merchant associated with the merchant device(s) 156. To this end, the merchant application 164 may be configured to transmit and/or otherwise provide information associated with the one or more purchase transactions to the payment processing server(s) 138 and/or the account database server(s) 120.

The payment processing device(s) 170 may be any electronic device capable of receiving payment information from a consumer 101, consumer device 102, merchant device 156, and/or any other devices. For instance, the payment processing device(s) 170 may be capable of receiving information via a magnetic strip on a card (e.g., a loyalty account card, a credit card, etc.) associated with the consumer 101. As another example, the payment processing device(s) 170 may also be configured to receive information via one or more NFC chips associated with the consumer 101. In yet other implementations, the payment processing device(s) 170 may receive payment information via manual entry or manual scanning using an electronic scanning device.

The system 100 shown in FIG. 1 is illustrated by way of example only. Other system embodiments can include fewer or greater numbers of elements and/or components, which may perform similar or different functions and/or operations than described above. One will recognize the applicability of the disclosure to various other system embodiments.

Figure 2:
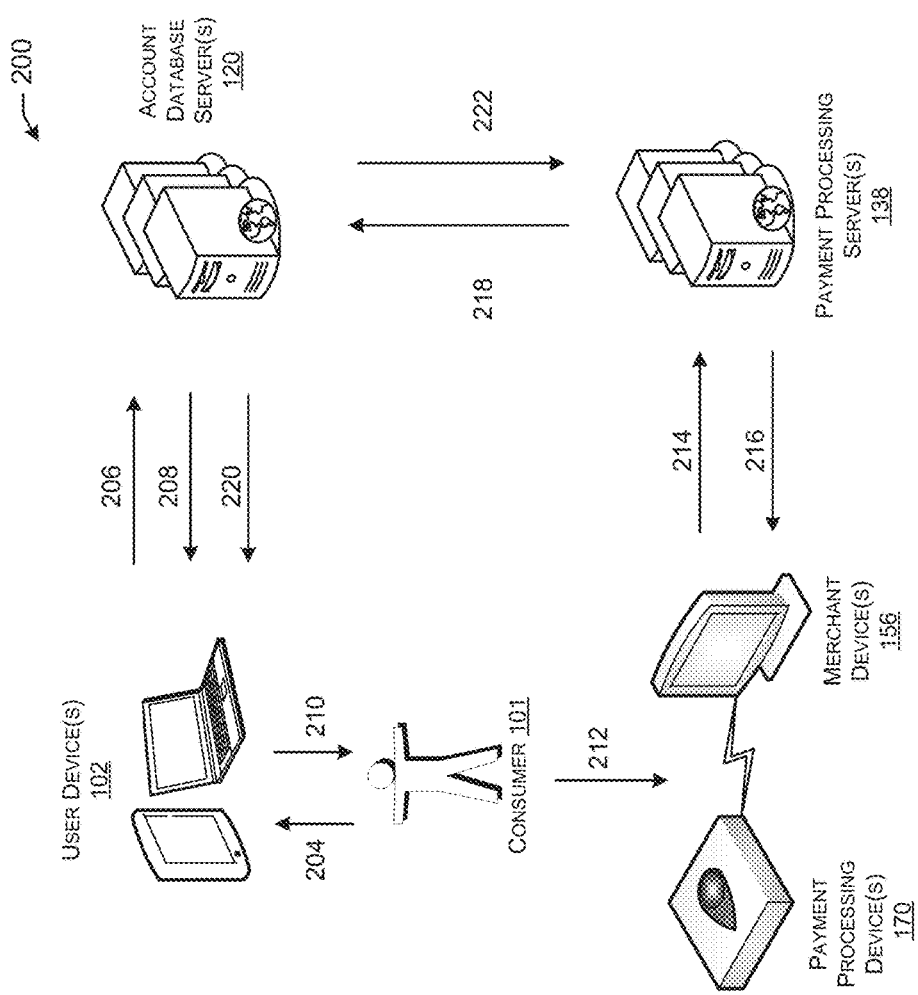
FIG. 2 illustrates a data flow diagram for managing accounts in accordance with one or more example embodiments.

Referring now to FIG. 2, a diagram of an example data flow 200 is illustrated for managing accounts in accordance with one or more example embodiments. According to the data flow 200, the consumer 101 obtains or otherwise identifies a proxy, such as a physical card. The consumer 101 may initiate a registration process for the proxy with a mobile application on a mobile device 102. The mobile application may prompt 210 the consumer 101 for information, and the consumer 101 may input 204 user information into the mobile application. The mobile device 102 may transmit 206 the user information to the account database server(s) 120 and may cause the user information to be stored and/or associated with certain existing accounts or cause new accounts to be opened and associated with the proxy. The account database server(s) 120 may confirm 208 the registration and association of accounts with the proxy to the mobile device 102, thereby completing the registration process. In some instances, the registration process may associate or otherwise enroll the proxy in a loyalty rewards program. Upon completing the registration process, the mobile application may provide the consumer 101 with a tutorial on the operation of the proxy, benefits associated with use of the proxy, for example loyalty benefits, and/or merchant partnerships attached to use of the proxy.

As part of the registration process or the tutorial, the mobile application may prompt the consumer 101 to register additional funding sources or forms of tender to associate with the proxy. Examples of funding sources or forms of tender can include, but are not limited to, credit or debit cards, bank accounts such as checking or saving accounts, prepaid card accounts, demand deposit accounts, gift cards, or other similar types of funding sources or forms of tender. The mobile application may include a verification process to prevent unauthorized access to a funding source or form of tender. For example, the consumer 101 may be prompted to submit a picture of a credit card for verification of the name and account information on the credit card, as well as verification of possession of the credit card. In one example, a consumer can enter information for a prepaid card or a gift card as a funding source. The mobile application can prompt the consumer 101 to select, from a list of participating merchants, the specific merchant the prepaid card or gift card is associated with. Upon selection of the specific merchant, the consumer 101 may key in and/or photograph the card number and/or EAN (electronic access number) or code. This information may be submitted by the consumer 101 and stored by the account database server(s) 120. The proxy can then be used by the consumer 101.

The consumer 101 may use the proxy at the payment processing device(s) 170 or the merchant device(s) 156 at the merchant location. The consumer 101 may use the mobile application to access the proxy and to transmit 212 proxy information to the payment processing device(s) 170 or the merchant device(s) 156. The payment processing device(s) 170 or the merchant device(s) 156 may receive the proxy information and communicate 214 the proxy information to the payment processing server(s) 138. The payment processing server(s) 138 may receive the proxy information, along with a merchant ID that identifies the merchant, and determine a payment account to be used for the purchase or transaction the consumer 101 wishes to complete. In some instances where the payment account information is not stored on the payment processing server(s) 138, the payment processing server(s) 138 may communicate 218, 222 with the account database server(s)

120 to determine the payment account information. In other embodiments, the payment account information may be stored at the payment processing server(s) 138. The payment processing server(s) 138 determines the payment account information and communicates 216 the payment account information to the payment processing device(s) 170 or the merchant device(s) 156 for completion of the transaction. The payment processing server(s) 138 may report details of the transaction to the mobile device 102, or in some embodiments, the account database server(s) 120 may communicate 220 details of the transaction to the mobile device 102.

In another example embodiment of the disclosure, a consumer may obtain a physical proxy in the form of a card from a physical retailer. The physical proxy may be displayed, for example on a J-hook or a small display as the physical proxy may or may not be the size of a common credit card, and may be any size sufficient to display a printed bar code or alphanumeric sequence. The physical proxy may have a prepaid denomination of, for example, between $25 and $1,000. The consumer may select a proxy with a desired prepaid denomination and purchase the proxy from the retailer. The proxy may include instructions for registering the proxy in a corresponding mobile application, and also instructions on converting the proxy balance into a merchant specific value. The instructions may be printed and included with the proxy, or information directing the consumer to the instructions may be printed and included with the proxy. For example, a website address may be printed on the packaging of the proxy.

Upon purchase of the proxy by the consumer, the retailer receives the funds for payment of the proxy from the consumer. The retailer can deposit the funds in a designated account that may be swept regularly by the proxy account host. The proxy account host may withdraw the funds and/or secure the funds with internet protocol security until the consumer registers the proxy with the mobile application and converts the balance into a specific merchant value. Once the consumer selects a specific merchant, the funds may be pushed to the designated accounts of the specific merchant. If there are discounts issued to the consumer at the point of sale, for example a balance of $50 is provided with the proxy in exchange for a payment of $40 from the consumer, the entire discount or a percentage of the discount may be subtracted from the proxy balance prior to pushing the funds to the designated merchant account.

In yet another example, a consumer may have a proxy already registered with the mobile application on the consumer's mobile device. The consumer may enter a participating merchant's physical location. The mobile device may detect a signal from a low power BLUETOOTH™ beacon placed within the merchant's physical location, for example near an entrance to the physical location. The signal may cause the mobile application on the consumer's mobile device 102 to open the mobile application on the mobile device and prompt the consumer 101. Prompts from the mobile application to the consumer may include information related to applicable accounts associated with the specific merchant, such as gift card accounts, prepaid accounts, loyalty rewards accounts, funding source accounts, or other accounts. The mobile application may further present deal information to the consumer, for example discounts available for purchases made using the proxy, discounts available for purchase from third parties, or other dynamic discounts or offers determined by the merchant to consumers based on consumer profiles.

The consumer may select items to purchase and may take them to the merchant POS. At the merchant POS, the consumer may open the mobile application and use the proxy as the form of payment at a merchant POS device. For example, the proxy may be displayed on a screen or display of the mobile device as a scannable barcode, or the proxy information may be communicated to the POS device via NFC. The proxy may also be presented by the consumer as a physical proxy, such as a card. After the POS device receives the proxy information, the transaction may be routed to the processing host, for example a cloud based host. The processing host, which could be the account database server(s) or the payment processing server(s) discussed above, receives the transaction and may compare the accounts associated with the proxy to the deals available to the consumer to determine if any matches exist.

For example, the consumer may be entitled to a 20% discount on a purchase for using the proxy. If the consumer purchased $100 worth of items or services, the processing host can determine that the consumer receives a discount of $20, for a total of $80. If the proxy balance is less than $80, for example $50, the processing host may determine whether a funding source is associated with the proxy. If the processing host determines a funding source is available, for example a credit card, the processing host may request the balance of $30 from the funding source and may initiate a transfer of funds from the funding source to the payment account. In some instances, the funding source may be an account associated with a different merchant. For example, funds from a gift card balance for one merchant may be transferred to an account for another merchant and the funds may then be transferred to the payment account.

If no funding source is associated with the proxy, the processing host may communicate to the POS device that a balance of $30 is due. The consumer may provide the merchant with additional funding to complete the transaction. In some instances, merchants may limit discounts or offers to purchases fully paid via proxies, rather than allowing consumers to provide additional funding at the POS.

In another embodiment of this disclosure, the mobile application may provide consumers with an option to purchase new prepaid accounts or an option to reload existing registered prepaid accounts associated with the proxy. The consumer may be incentivized for purchasing or reloading accounts based on balances, for example. Purchases or reloading of prepaid accounts may be actively initiated by consumers or may be setup by a consumer to occur automatically, for example based on certain account characteristics such as balance or based on time periods. Merchants may have an option to enable or disable purchase and/or reloading of merchant specific accounts via the mobile application.

When a purchase or reload action is initiated, either actively by a consumer or automatically based on consumer selected preferences, funds for the purchase or reload activity may be acquired from the funding source associated with the proxy. As discussed above, funding sources can include, for instance, credit cards, payroll cards, eCheck, ACH, or other sources. Funds may be transferred from the funding source to the new or existing prepaid account and the transaction may be settled by the processing host.

After transactional activity has occurred in any account associated with a proxy, the resulting transaction data can be delivered to the consumer and to the merchant. For consumers, the transactional data may be delivered via the mobile application. Transactional data can include details of the transaction such as any prepaid value spent and all offers redeemed or discounts received, as well as details regarding whether a funding source was used for settlement purposes.

Merchants can receive transactional data for reconciliation in real time or may be provided via a batch file process.

The data flow 200 shown in FIG. 2 is illustrated by way of example only. Other data flow embodiments can include fewer or greater numbers of operations, elements and/or components, which may perform similar or different functions and/or operations than described above. One will recognize the applicability of the disclosure to various other data flow embodiments.

Figure 3:
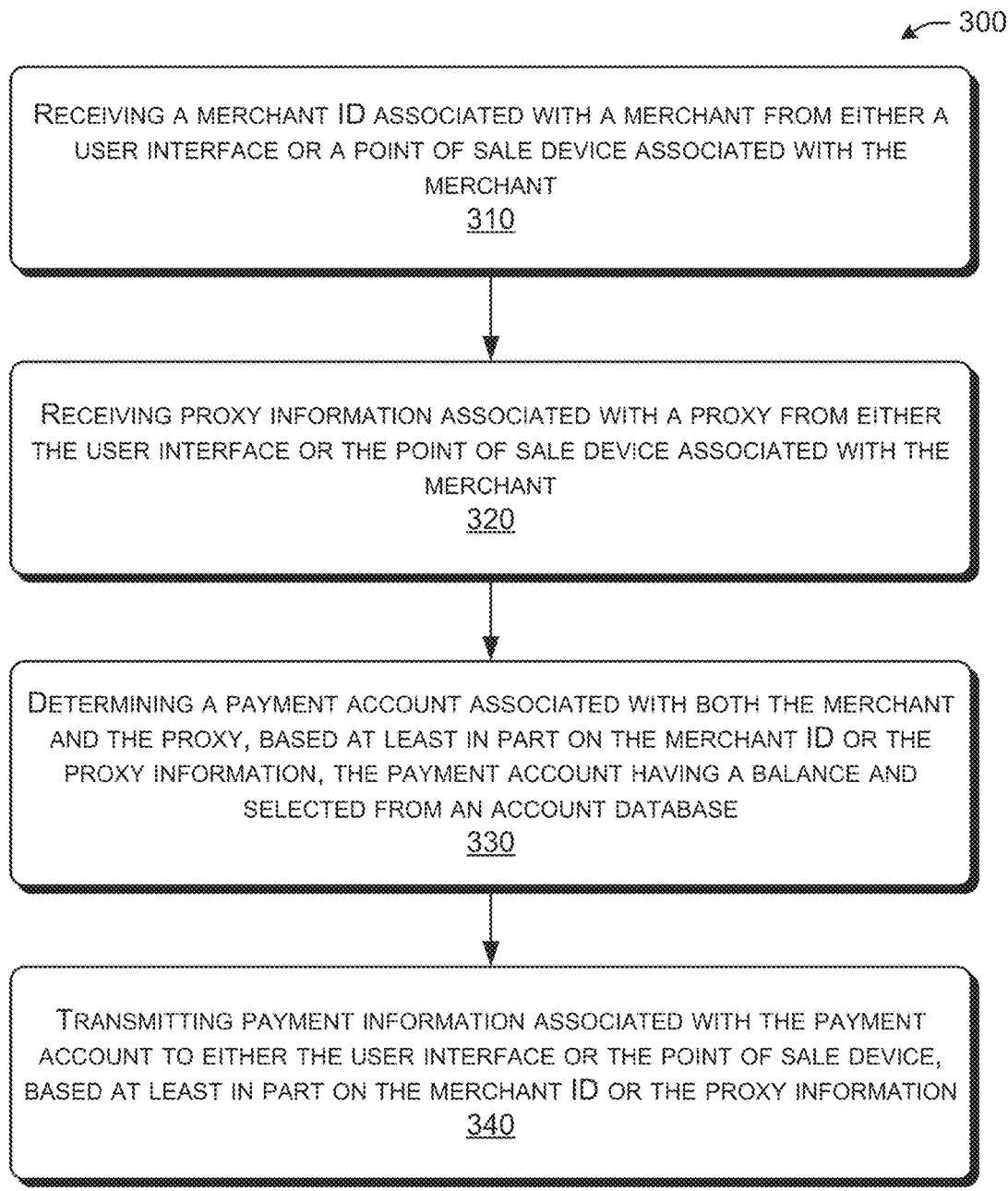
FIG. 3 illustrates a flow diagram of an example data flow for managing accounts in accordance with one or more example embodiments.

Referring now to FIG. 3, a flow diagram of an example method 300 for managing accounts is illustrated in accordance with one or more example embodiments. The method may include block 310, in which a server, such as payment processing server(s) 138 in FIG. 1, may receive a merchant identifier (ID) associated with a merchant via a user interface of a consumer device (e.g., consumer device 102) or a point of sale device associated with the merchant such as the merchant device(s) 156 and/or the payment processing device 170 of FIG. 1. At block 320, the payment processing server(s) 138 may receive proxy information associated with a proxy from either the user interface or the point of sale device. At block 330, the payment processing server(s) 138 may determine a payment account associated with both the merchant and the proxy, based at least in part on the merchant ID or the proxy information. The payment account may have a balance and may be selected from an account database, for example from DBMS 146. The payment account may be used for the transaction initiated by consumer 101. At block 340, the payment processing server(s) 138 may transmit payment information associated with the payment account to either the user interface or the point of sale device, based at least in part on the merchant ID or the proxy information.

Figure 4:
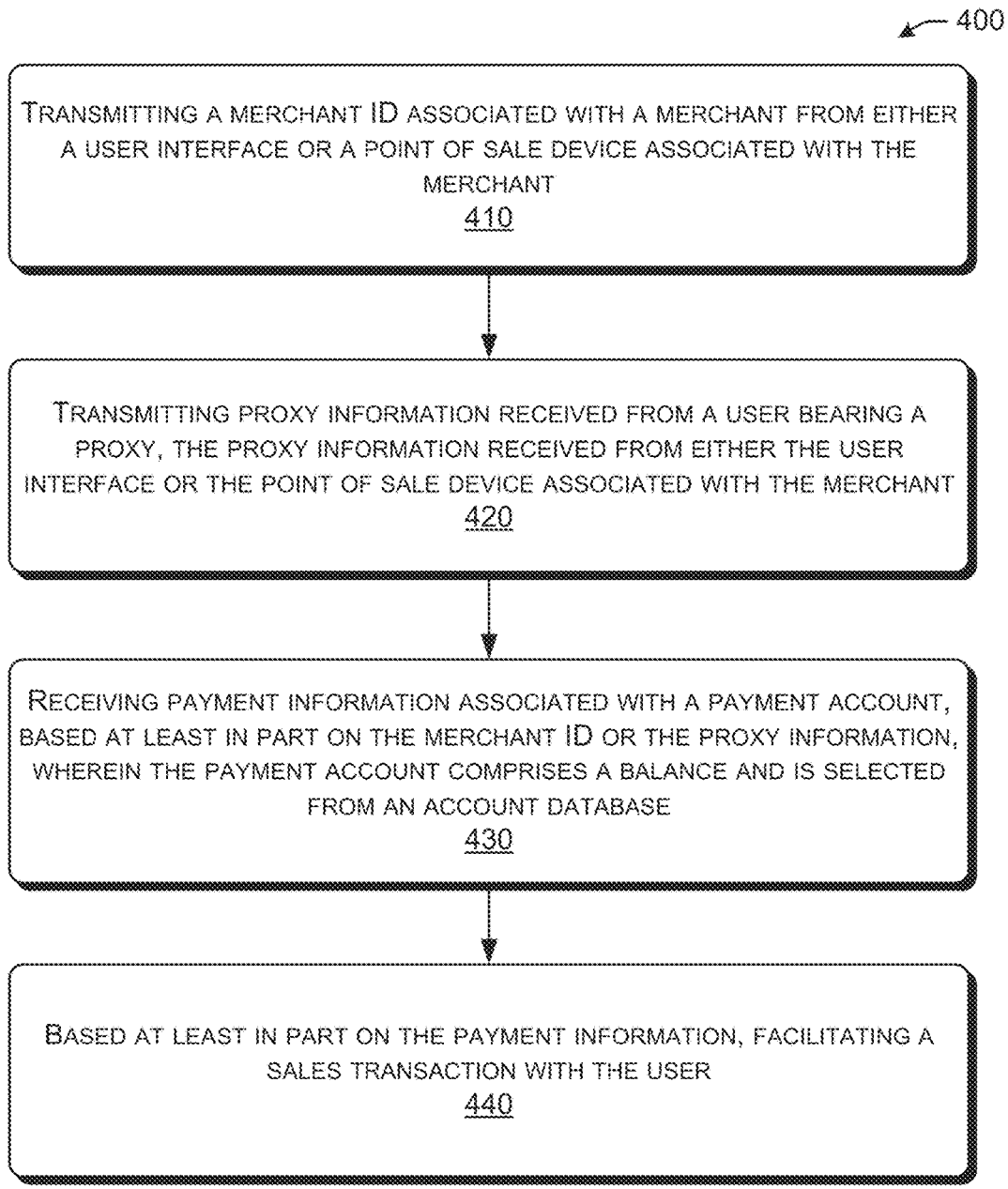
FIG. 4 illustrates a flow diagram of another example method for managing accounts in accordance with one or more example embodiments.

Referring now to FIG. 4, a flow diagram of an example method 400 for managing accounts is illustrated according to one or more example embodiments. The method 400 may include block 410, in which a point of sale device, such as merchant device(s) 156 and/or payment processing device(s) 170 of FIG. 1, may transmit a merchant ID associated with a merchant from either a user interface or a point of sale device associated with the merchant. At block 420, the point of sale device may transmit proxy information received from a user bearing a proxy. The proxy information may be received by the point of sale device from either the user interface or the point of sale device associated with the merchant. The proxy information may be received by, for example, the payment processing server(s) 138 in FIG. 1. At block 430, the point of sale device may receive, for example from the payment processing server(s) 138, payment information associated with a payment account, based at least in part on the merchant ID or the proxy information. The payment account may have an available balance and may be selected from an account database, such as from account database server(s) 120 of FIG. 1. At block 440, the point of sale device may facilitate a sales transaction with the user, based at least in part on the payment information.

Using the embodiments described herein, prepaid accounts and loyalty accounts, among other accounts, may be associated with a proxy, thereby serving two or more purposes in a single transaction with the proxy. First, the prepaid account may be used for the purchase, and second, the loyalty account may be credited for the purchase, allowing the consumer to collect any applicable rewards. In addition, the proxy may also be used to account for the surrounding impacts to funding, settlement and/or reporting for the transaction. A merchant may communicate to consumers via, for example, mobile applications that provide information regarding the proxy.

Further, merchants may have loyalty marketing solutions, for example a real-time loyalty marketing program that dynamically prompts or otherwise communicates with consumers, for example based on consumer location. A real-time loyalty marketing program may include a loyalty account, prepaid accounts, gift card accounts, or other accounts. Real-time loyalty marketing programs may include accrual capabilities that incorporate purchase and/or use of physical or virtual prepaid cards, for example. Instead of or in addition to prepaid cards, reloadable cards can be incorporated. Merchants may utilize real-time loyalty marketing programs to drive sales. The systems and methods described above may assist merchants in encouraging consumers to hold balances on accounts associated with the merchant.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method comprising:
   receiving location information associated with a consumer;
   automatically opening a proxy application associated with a proxy on a mobile device when the consumer is located near or at a merchant at which the consumer has an account linked with the proxy;
   receiving a merchant ID associated with a merchant from either a user interface or a point of sale device associated with the merchant;
   receiving proxy information associated with the proxy from either the user interface or the point of sale device associated with the merchant;
   determining a first payment account associated with both the merchant and the proxy, based at least in part on the merchant ID or the proxy information, the first payment account having a balance and selected from an account database;
   determining that the balance is less than a transaction amount;
   transferring an amount of funds from a second payment account associated with the proxy to the first payment account, wherein the second payment account is associated with a different merchant ID; and
   transmitting payment information associated with the first payment account to either the user interface or the point of sale device, based at least in part on the merchant ID or the proxy information.

2. The method of claim 1, further comprising associating the proxy with a funding account associated with at least one of a bank account, a credit card, or a prepaid account.

3. The method of claim 2, further comprising transferring funds from the funding account to the first payment account based at least in part on the balance of the first payment account.

4. The method of claim 3, wherein the funding account is associated with a merchant that is different than the merchant associated with the first payment account.

5. The method of claim 1, wherein the user interface is associated with the mobile device.

6. The method of claim 1, further comprising transmitting updated balance information associated with the first payment account to the user interface or to the point of sale device.

7. The method of claim 1, further comprising:
   determining a promotional offer based at least in part on the merchant ID or the proxy information; and
   transmitting the promotional offer to either the user interface or the point of sale device.

8. The method of claim 1, further comprising:
   determining a promotional offer based at least in part on the location information; and
   transmitting the promotional offer to either the user interface or the point of sale device.

9. The method of claim 1, wherein the first payment account is at least one of a prepaid account, a credit card, or a bank account.

10. The method of claim 1, wherein the proxy is at least one of a proxy card, a proxy printed barcode, or a virtual proxy.

11. A system comprising:
    at least one processor; and
    at least one memory comprising computer-executable instructions, that when executed by the at least one processor, causes the at least one processor to:
      receive location information associated with a consumer;
      automatically open a proxy application associated with a proxy on a mobile device when the consumer is located near or at a merchant at which the consumer has an account linked with the proxy;
      receive a merchant ID associated with a merchant from either a user interface or a point of sale device associated with the merchant;
      receive proxy information associated with the proxy from either the user interface or the point of sale device associated with the merchant;
      determine a first payment account associated with both the merchant and the proxy, based at least in part on the merchant ID or the proxy information, the first payment account having a balance and selected from an account database;
      determine that the balance is less than a transaction amount;
      transfer an amount of funds from a second payment account associated with the proxy to the first payment account, wherein the second payment account is associated with a different merchant ID; and
      transmit payment information associated with the first payment account to either the user interface or the point of sale device, based at least in part on the merchant ID or the proxy information.

12. The system of claim 11, wherein the computer-executable instructions further causes the at least one processor to:
    associate the proxy with a funding account associated with at least one of a bank account, a credit card, or a prepaid account.

13. The system of claim 12, wherein the computer-executable instructions further causes the at least one processor to:
    transfer funds from the funding account to the first payment account based at least in part on the balance of the first payment account.

14. The system of claim 13, wherein the funding account is associated with a merchant that is different than the merchant associated with the first payment account.

15. The system of claim 11, wherein the user interface is associated with the mobile device.

16. The system of claim 11, wherein the computer-executable instructions further causes the at least one processor to:
    transmit updated balance information associated with the first payment account to the user interface or to the point of sale device.

17. The system of claim 11, wherein the computer-executable instructions further causes the at least one processor to:
    determine a promotional offer based at least in part on the merchant ID or the proxy information; and transmit the promotional offer to either the user interface or the point of sale device.

18. The system of claim 11, wherein the computer-executable instructions further causes the at least one processor to:
determine a promotional offer based at least in part on the location information; and
transmit the promotional offer to either the user interface or the point of sale device.

19. The system of claim 11, wherein the first payment account is at least one of a prepaid account, a credit card account, or a bank account; and
the proxy is at least one of a proxy card, a proxy printed barcode, or a virtual proxy.

20. A method comprising:
receiving location information associated with a consumer;
automatically opening a proxy application associate with a proxy on a mobile device when the consumer is located near or at a merchant at which the consumer has an account linked with the proxy;
transmitting a merchant ID associated with a merchant from either a user interface or a point of sale device associated with the merchant;
transmitting proxy information received from a user bearing a proxy, the proxy information received from either the user interface or the point of sale device associated with the merchant;
receiving payment information associated with a first payment account, based at least in part on the merchant ID or the proxy information, wherein the payment account comprises a balance and is selected from an account database;
determining that the balance is less than a transaction amount;
transferring an amount of funds from a second payment account associated with the proxy to the first payment account, wherein the second payment account is associated with a different merchant ID; and
based at least in part on the payment information, facilitating a sales transaction with the user.

* * * * *